United States Patent [19]

Newnan

[11] Patent Number: 4,913,037
[45] Date of Patent: Apr. 3, 1990

[54] MOISTURE PROTECTION SYSTEM FOR THE PARTICULATE FOOD DELIVERY APPARATUS OF BEVERAGE PREPARING MEANS

[75] Inventor: Brian D. Newnan, Louisville, Ky.

[73] Assignee: Grindmaster Corporation, Louisville, Ky.

[21] Appl. No.: 362,311

[22] Filed: Jun. 6, 1989

[51] Int. Cl.$^4$ ............................................. A47J 31/00
[52] U.S. Cl. .................... 99/286; 99/289 R; 99/295; 99/290; 241/101.2
[58] Field of Search ............. 99/286, 289 R, 295, 99/279, 284, 290; 241/101.2, 282.1, 282.2, 277; 426/433

[56] References Cited

U.S. PATENT DOCUMENTS

| | | | |
|---|---|---|---|
| 4,510,853 | 4/1985 | Takagi | 99/286 |
| 4,555,984 | 12/1985 | Yamashita | 241/101.2 |
| 4,624,177 | 11/1986 | Ito | 99/286 |
| 4,659,023 | 4/1987 | Frei | 241/30 |
| 4,706,555 | 11/1987 | Nakamura | 99/286 |

Primary Examiner—Robert W. Jenkins
Attorney, Agent, or Firm—Maurice L. Miller, Jr.

[57] ABSTRACT

A system for preventing the escape of moisture from a beverage preparing device, such as a coffee brew basket, into apparatus for delivering a dry particulate food product, such as a coffee grinder, to the device during the beverage preparing process. The system includes a support plate containing a rectangular opening. A brew basket can be removably suspended from the plate under the opening. An elongated rod, rotatable about its longitudinal axis, is connected across the plate so as to extend across an edge of the opening. A flap is fixedly attached to the rod for tilting as the rod rotates between a closed position in which the opening is sealed against moisture penetration and a downwardly extending position such that the food product can be delivered through the opening to the basket. A spring biases the rod to an angular position of rotation such that the flap is normally closed to seal the opening. A solenoid mounted on the plate is linked to a lever arm on the rod which, when activated, rotates the rod in opposition to the spring to tilt the flap to the open position. A guide hood directs ground coffee ejected from the grinder through the opening into the basket when the solenoid is activated and the flap is open. Upon deactivation of the solenoid, the spring returns the flap to the closed position.

20 Claims, 2 Drawing Sheets

MOISTURE PROTECTION SYSTEM FOR THE PARTICULATE FOOD DELIVERY APPARATUS OF BEVERAGE PREPARING MEANS

BACKGROUND OF THE INVENTION

This invention relates generally to devices for preventing or inhibiting the escape of moisture from a beverage preparing apparatus into apparatus for delivering a dry particulate food product to the beverage preparing apparatus.

For example, in recent years there has been much energy devoted to development of combination coffee grinder/brewer machines. The brewing portion of such machines typically utilizes hot water generating means to deliver boiling or nearly boiling water to a spray nozzle arrangement which, in turn, sprays the hot water into a brew basket containing a measured amount of ground coffee. The grinder portion of the machine grinds coffee beans to a desired particulate size, whereupon the ground coffee is delivered by suitable means to a paper filter containing brew basket of the usual, well known type.

A problem that has been encountered using such prior art grinder/brewer arrangements is that hot water vapors resulting from the spraying of hot water into the brew basket tend to escape into the ground coffee delivery system and the grinder itself, often resulting in a considerable mess and necessitating frequent and difficult cleaning operations. This problem is dealt with by the coffee grinder/brewer disclosed in U.S. Pat. No. 4,510,853 issued to S. Takagi on Apr. 16, 1985. The reference device employs a grinder which rotates in a vertical plane within a case to grind coffee and dump the resulting powder into a cone shaped accumulator containing a similarly cone shaped paper filter. After the grinding operation is completed, hot water rises through a pipe and flows into the case to clean the grinder and case walls, after which it flows into the accumulator to mix with the ground coffee in the filter. Liquid coffee is then strained through an orifice into a serving pot. Here, of course, the grinder is rinsed with the same hot water which is used to make liquid coffee after each grinding operation.

Another example is U.S. Pat. No. 4,624,177 issued to N. Ito et al. on Nov. 25, 1986 which discloses a grinder having a brew basket located under the edge of a grinder chamber for receiving ground coffee from a grinder through perforations in a chamber defining wall. A sloping front cover directs ground coffee blown out of the chamber into the basket. A sloping cylindrically shaped cap on the grinder housing permits hot water poured thereon from water lines to run off a sloping tongue into the basket without wetting the grinder or, at least, so it is claimed. It would seem, however, that water vapor from the brew basket could back up through the grinder wall perforations to cause at least some wetting of coffee in the grinder. In any case, the fact that there is no effective vapor tight seal between the brew basket and the grinder while the coffee beverage is being prepared is perceived as a disadvantage.

Lastly, U.S. Pat. No. 4,659,023 issued to H. P. Frei et al. on Apr. 21, 1987, unlike the previously mentioned grinder/brewer arrangements does provide means for keeping moisture from escaping from a coffee brewing chamber into an associated grinder during the brewing operation. The reference device includes a ground coffee proportioning chamber having a flexible resilient wall disposed between a grinder outlet orifice and a brewer. An L-shaped bottom wall part of the proportioning chamber is pivotal between a closed position where it is held by a locking mechanism and an open position wherein a portioned amount of ground coffee is dumped into the brewer. A cam is rotated through an arc to alternately push a spring lever to close the bottom wall part into locking relation with the locking mechanism and pull the spring lever to unlock the bottom wall part from the locking mechanism to dump ground coffee from the proportioning chamber. The cam and grinder are operated by a microswitch which is, in turn, activated by expansion of the flexible wall of the proportioning chamber as the result of the latter becoming filled with the desired amount of ground coffee blown therein from the grinder. Clearly, proper timing and mechanical interaction between the cam, spring lever, pivotal bottom wall part, locking mechanism, flexible resilient proportioning chamber wall and microswitch are critical to proper operation of the reference device. Because of the relative complexity of the reference device, obtaining such proper mechanical interaction repeatedly over many cycles of operation is perceived as substantial problem, quite apart from the shear complexity of the device itself.

By means of my invention, I provide a moisture protection system for a dry particulate food delivery system of a beverage preparing means which substantially overcomes these and other difficulties encountered in the prior art.

SUMMARY OF THE INVENTION

It is an object of my invention to provide a moisture protection system for an apparatus which delivers a dry particulate food product to a beverage preparing means during the beverage preparing operation.

It is a further object of my invention to provide a moisture protection system for an apparatus which delivers ground coffee to coffee brewing means during the brewing operation.

It is also an object of my invention to provide a moisture protection system for a grinder and ground coffee delivery system of a combination coffee grinder/brewer apparatus.

Briefly, in accordance with my invention, there is provided a moisture protection system for an apparatus which delivers a dry, particulate food product to a liquid beverage preparing means. The system includes support means defining an opening therethrough which is adapted to communicate with a beverage preparing device disposed in receiving relation with the opening. A sealing means is tiltibly connected to the support means for effectively preventing the escape of moisture from the beverage preparing device through the opening when in a first position and for permitting the beverage preparing device to communicate with the opening when in a second position. The system also includes biasing means which tends to maintain the sealing means in the first position. Means is operatively connected to the sealing means for tilting the sealing means from the first to the second position in opposition to the biasing means when activated and for permitting the biasing means to return the sealing means to the first position when de-activated. Lastly, guide means is provided which is connected to the support means for guiding a dry particulate food product introduced therein through the opening and into the beverage preparing means when the sealing means is in the second position.

These and other objects, features and advantages of the present invention will become apparent to those skilled in the art from the following detailed description and attached drawings upon which, by way of example, only a preferred embodiment of the present invention is described and illustrated.

DESCRIPTION OF THE PREFERRED EMBODIMENT

Figure 1:
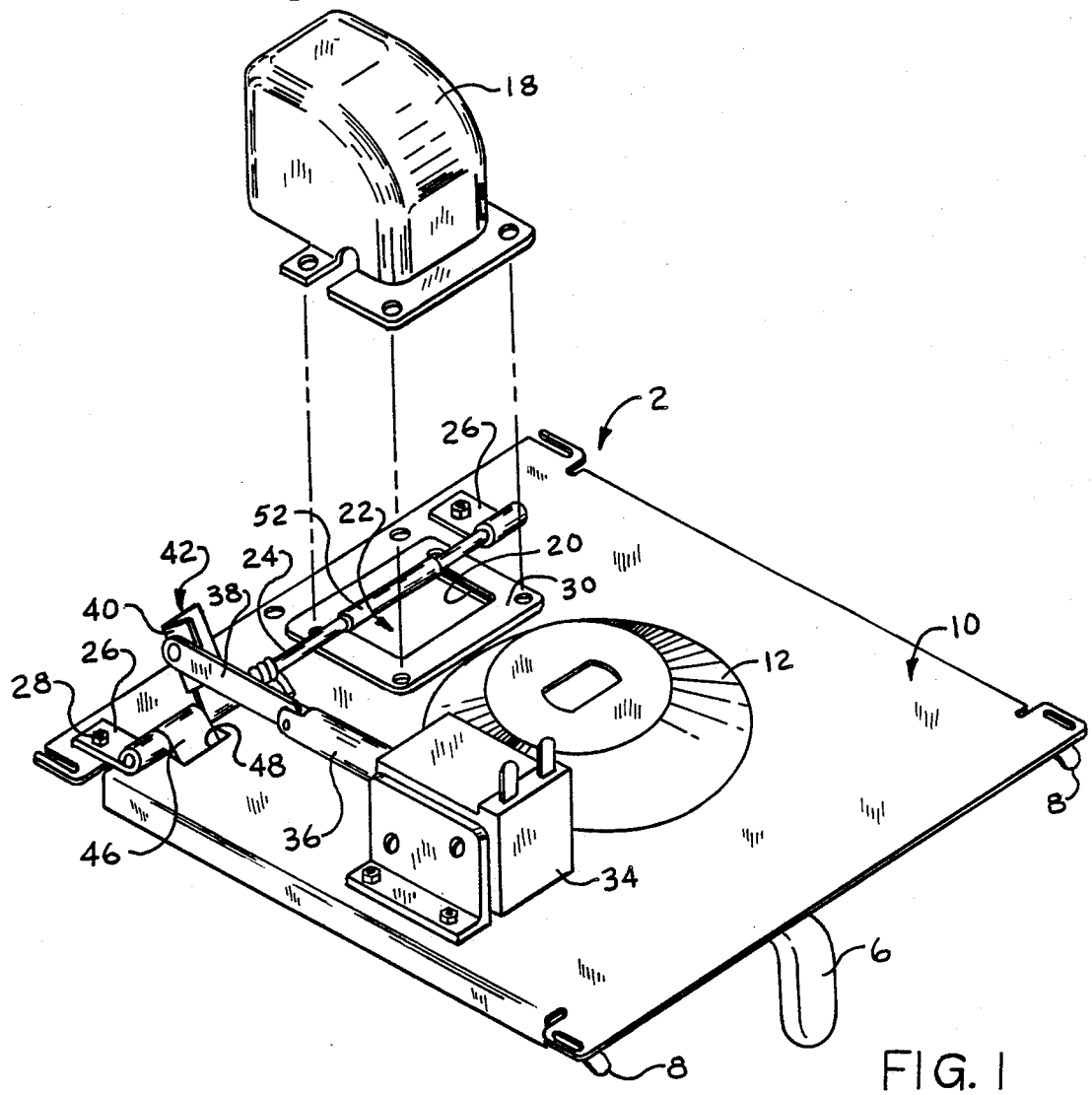
FIG. 1 shows a partially exploded perspective view of a moisture protection system in an assembly for delivering a preportioned amount of dry, ground coffee to a brewing means, thus illustrating one preferred embodiment of my invention.

Referring now to the drawing figures there is shown in one preferred embodiment of my invention, a coffee grinder/brewer apparatus 2 of any suitable type. As is conventional, the grinder portion of the assembly 2 is contained in a suitable upstanding housing 4 having an overhanging portion from which a brew basket 6 is removably suspended on a pair of spaced, parallel extending rails 8. A plate 10 forms a lower surface of the overhanging portion and includes a raised circular dome 12 containing a water spray nozzle arrangement for directing hot water downwardly into the brew basket 6 upon command. The grinding burrs 14 of a conventional coffee grinder are located in an upper section of the grinder portion of the housing 4 and are adapted to eject ground coffee away from the periphery thereof through an outlet orifice 16 into an elbow shaped hollow guide hood 18.

Figure 2:
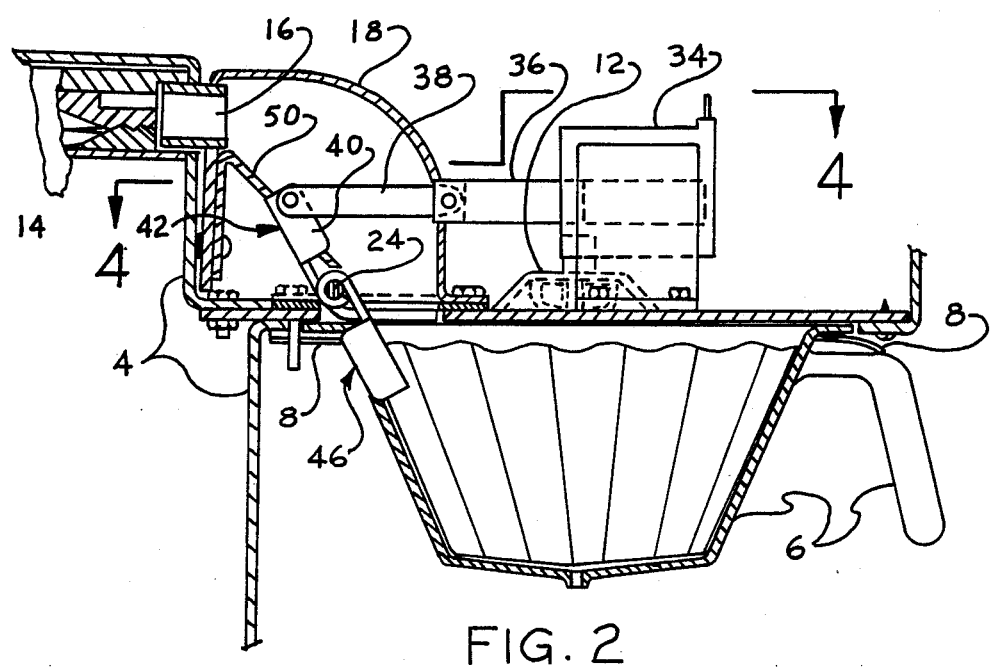
FIG. 2 shows a cross sectional side elevation view of the system, assembly and brewing means of FIG. 1 with a portion of a grinder and grinder housing added, the system being in a closed position wherein the assembly is isolated from the brewing means.
Figure 3:
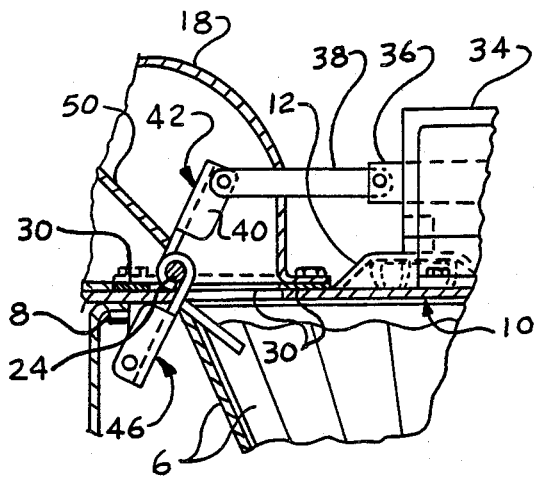
FIG. 3 shows a cross sectional side elevation view of a fragment of the system, assembly and brewing means of FIGS. 1-2, the same as viewed in FIG. 2 with the system being in an open position for delivery of ground coffee from the assembly to the brewing means.
Figure 4:
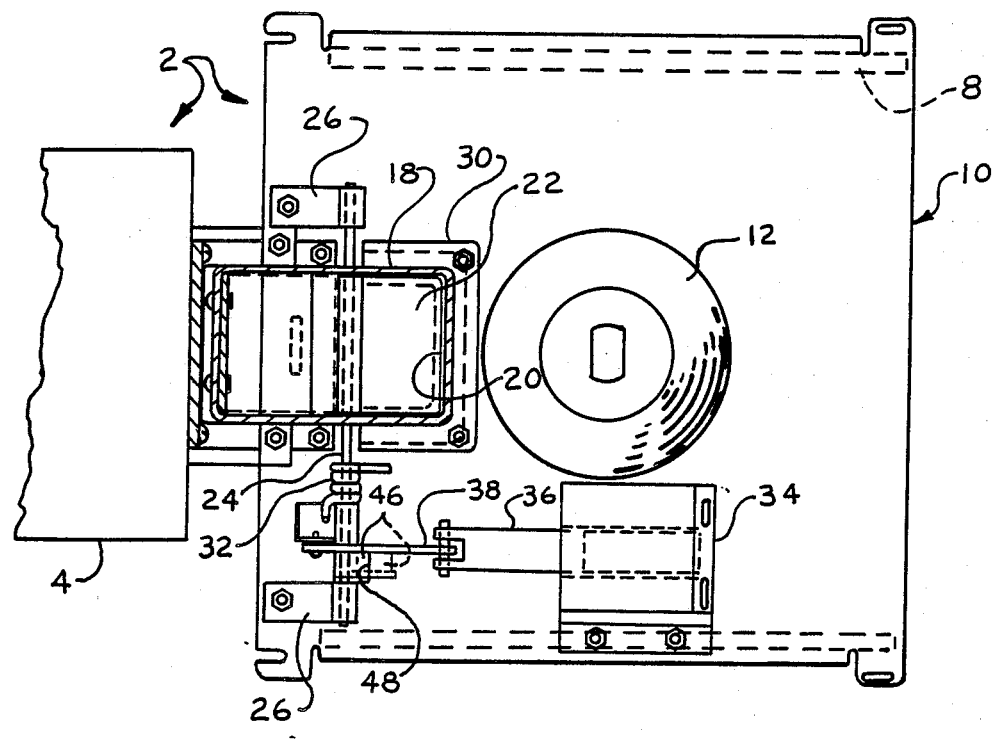
FIG. 4 shows a top plan view of the system and assembly of FIGS. 1-3 with the grinder and grinder housing of FIG. 2 added.
Figure 5:
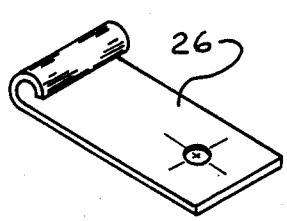
FIGS. 5-7 show perspective views of three different components of the system of FIGS. 1-4.
Figures 6, 7:
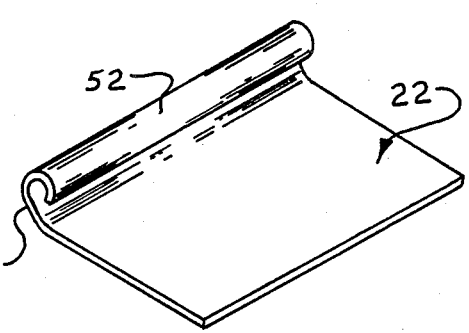

The hood 18 guides ground coffee ejected from the orifice 16 through a rectangularly shaped opening 20 in the plate 10 into the brew basket 6 provided that a rotatably movable flap 22 is in an open position as shown in FIG. 3. The flap 22, as shown in detail in FIG. 7, is fixedly attached to a rotatable rod 24 for movement therewith. End portions of the rod 24 are confined within cylindrical collar portions of a pair of anchor members 26 (see also FIG. 5), the members 26 being, in turn, secured to an upper surface of the plate 10 with suitable fasteners 28. A suitable flexible resilient gasket 30 of rectangular shape surrounds the opening 20, inner edge portions of which gasket extend slightly inwardly of the boundaries of opening 20, against which edge portions the flap 22 fits when the latter is closed as shown in FIG. 2.

The flap 22 is biased to a normally closed position in the opening 20 by means of a coiled spring 32 surrounding a portion of the rod 24 such that the bias force of the spring 32 must be overcome to open the flap 22 downwardly. With the flap 22 closed as shown in FIG. 2, the spring 32 rests upon the upper surface of the plate 10 in a partially compressed state due to one of its legs which bears against the plate 10 at all times. To open the flap 22 the rod 24 is rotated by either one of two separate means to further compress the spring 32.

One such means is an electrically operated solenoid 34 of any suitable, well known type having a retractable plunger 36, the outer end of which is pivotally connected to one end of a link 38, the other end of the link 38 being pivotally connected to a shoulder 40 of a lever arm 42. The lever arm 42 contains a rolled collar 44 on an end portion opposite the end portion containing the shoulder 40, which collar 44 tightly surrounds a portion of the rod 24 so as to be rotatably movable with the latter. The lever arm 42 is shown in detail in FIG. 6. The arrangement of the present example requires a solenoid 34 which is electrically activated to retract the plunger 36 from a floating, extended, de-activated condition as shown in FIG. 2 to a retracted, activated condition as shown in FIG. 3 in order to open the flap 22 to allow ground coffee ejected from the grinder burrs 14 to flow into the basket 6. In such an arrangement, the solenoid 34 should be activated to retract the plunger 36 to open the flap 22 in response to activation of the grinder burrs 14 and should remain activated for the full period of time that the grinder burrs 14 operate and slightly beyond in order to provide an opportunity for all of the coffee ground by the burrs 14 during a given grinding cycle to be discharged into the basket 6. Making and maintaining the solenoid 34 active in response to the application and maintenance of operating voltage on the grinder motor will produce the desired result.

Another means for operating the flap 22 is that of a manually operatable finger tab 46 having a rolled end portion tightly surrounding the rod 24 for tilting movement of the tab therewith, which extends downwardly through an opening 48 in the plate 10 so that the finger tab 46 can be pushed by hand manually to open the flap 22 for inspection and cleaning of an interior outlet end portion of the guide hood 18. Pushing a lower end portion of the tab 46 rearwardly as viewed in FIG. 2 will thus rotate the rod 24 to tilt the flap 22 downwardly toward the position shown in FIG. 3. Since the grinder burrs 14 and solenoid 34 will be de-energized when inspection and cleaning of the hood 18 is undertaken, the plunger 36 will be floating in the solenoid body and will offer little if any resistance to operation of the finger tab 46.

The guide hood 18 contains a ramp 50 extending downwardly and outwardly from a lower edge of the orifice 16 over an upper portion of a collar 52 of the flap 22. The ramp 50 preferably should be inclined downwardly at an angle which is at least equal to the angle of repose of dry ground coffee to assure flow of coffee downwardly along the ramp 50 from the grinder outlet orifice 16 through the opening 20 into the brew basket 6. A ramp incline of 45 degrees should prove satisfactory in most cases.

The flap 22 contains a flat portion sufficient to overlap three adjacent edge portions of the gasket 30 to form a complete seal and a neck portion 54 extending diagonally through the opening in the gasket 30 to allow the flat portion to underly the gasket 30 in a flush manner when in the closed position of FIG. 2. For ease and uniformity in manufacture, the finger tab 46 may be identical in construction to the lever arm 42. Of course, when the arm 42 is used as a model for the finger tab 46, a pivot pin hole 55 in the shoulder 40 will be unnecessary and, if in existence, will be unused.

In operation, when the grinder burrs 14 and solenoid 34 are activated, the flap 22 opens downwardly in opposition to the bias of the spring 32 to permit ground coffee ejected through the orifice 16 to be guided within the hood 18 through the opening 20 in the plate 10 and into a paper filter in the brew basket 6. The downward inclination of the flap 22 during grinder operation not only restains the paper filter from collapsing in the brew basket 6 but also maintains the basket 6 in communication with the opening 20. Upon de-activation of the grinder burrs 14 and solenoid 34, the spring 32 rotates the rod 24 while the lever arm 42 simultaneously draws the now floating plunger 36 out of the body of the solenoid 34 to close the flap 22 against the gasket 30 and seal the opening 20 against moisture penetration. Thereafter, hot water can be ejected from the spray nozzles in the dome 12 downward into the coffee containing brew basket 6 without hot water splashing into or water vapor entering the guide hood 18. Thus, the possibility of obtaining wet sticky ground coffee in the hood 18 and in the grinding chamber containing the burrs 14 is greatly minimized, if not altogether eliminated.

It will be appreciated that this same type of moisture protective system can also be used to prevent or impede moisture escape from a coffee brewing system into other types of coffee delivery systems such as an auger used for delivering pre-portioned ground coffee to brewing means such as the brew basket 6. Also, the system can be used to prevent or impede the escape of moisture from other types of brewing and/or liquid mixing means into the delivery system for dry granulated foodproducts such as chocolate milk or carbonated beverage mixing apparatus, hot chocolate or tea making apparatus and so forth. It will also be appreciated that the opening 20 need not necessarily be of rectangular shape but can be of any other suitable shape such as circular, semi-circular and so forth. The rectangular shape of the opening 20 of the present example is the result of space considerations in view of the need to remain clear of the relatively large diameter of the dome 12 and yet remain over the basket 6.

Although the present invention has been described with respect to specific details of a certain preferred embodiment thereof, it is not intended that such details limit the scope of the present invention other than as specifically set forth in the following claims.

I claim:

1. A moisture protection system for an apparatus which delivers a dry particulate food product to a liquid beverage preparing means, said system comprising
   support means defining an opening therethrough adapted for communication with a beverage preparing device,
   sealing means tiltably connected to said support means for effectively preventing the escape of moisture from said beverage preparing device through said opening when in a first position and for permitting said beverage preparing device to communicate with said opening when in a second position,
   biasing means tending to maintain said sealing means in said first position,
   means operatively connected to said sealing means for tilting said sealing means from said first to said second position in opposition to said biasing means when activated and for permitting said biasing means to return said sealing means to said first position when de-activated, and
   guide means connected to said support means for guiding a dry particulate food product introduced therein through said opening to a beverage preparing device when said sealing means is in said second position.

2. The system of claim 1 wherein said support means comprises a plate.

3. The system of claim 2 wherein said beverage preparing device comprises a coffee brewing basket removably disposed under said plate, said apparatus comprising a coffee bean grinder for delivering dry ground coffee to said basket.

4. The system of claim 1 wherein said opening is rectangularly shaped.

5. The system of claim 1 wherein said beverage preparing device comprises a brewing basket.

6. The system of claim 1 wherein said sealing means comprises a flap adapted to seal said opening when in said first position.

7. The system of claim 1 wherein said sealing means comprises
   an elongated, cylindrically shaped rod rotatably attached to said support means and extending across and edge portion of said opening, and
   a flap fixedly attached to said rod for rotation therewith, said flap being adapted to effectively seal said opening against moisture penetration when in said first position.

8. The system of claim 1 wherein said biasing means comprises a spring.

9. The system of claim 1 wherein said tilting means comprises a solenoid.

10. The system of claim 1 wherein said tilting means comprises a solenoid having a plunger which is held in a retracted position when said solenoid is activated, said plunger being free floating between said retracted position and a fully extended position when said solenoid is de-activated.

11. The system of claim 1 wherein said guide means comprises a hollow guide hood.

12. The system of claim 1 wherein said guide means comprises a hollow guide hood in the shape of an elbow.

13. The system of claim 1 wherein said guide means comprises
   a hollow guide hood in the shape of an elbow having a vertically extended opening at its input end and a horizontally extending opening at its output end, and
   a ramp extending diagonally downward from a lower edge of the input end opening toward an edge of said output end opening, said ramp being inclined at a vertical angle which is at least as great as the angle of repose of said dry particulate food 14. The system of claim 1 further comprising a finger tab operatively associated with said sealing means for manually tilting said sealing means toward said second position in opposition to said biasing means to expose said opening for inspection and cleaning of said guide means.

15. The system of claim 1 further comprising a compressible resilient gasket connected to said support means and surrounding said opening, said sealing means compressing against at least a portion of said gasket when in said first position.

16. The system of claim 1 wherein said sealing means is adapted to restrain a paper filter disposed in said beverage preparing device from collapsing and for maintaining said device in communication with said opening when in said second position.

17. A moisture protection system for the grinder portion of a combination coffee grinder/brewer comprising a housing containing a coffee grinder and defining an outlet orifice through which ground coffee is ejected, a support plate forming a bottom surface of an overhanging portion of said housing, said support plate defining an opening therethrough, a coffee brew basket removably connected to the lower surface of said support plate for communication with said opening, an elongated rod movably connected to an upper surface of said plate for rotation about its longitudinal axis, said rod extending across an edge portion of said opening, a flap flexibly connected on one edge portion thereof to said rod for vertically tilting between a first horizontal position in which said opening is sealed and a second position wherein said flap is inclined downwardly away from said opening, a coiled spring surrounding a portion of said rod adjacent said flap and bearing upon an upper surface of said plate so as to bias said flap toward said first position, a lever arm fixedly connected to said rod adjacent said spring and flap, a solenoid mounted on said plate and operatively connected to said lever arm for rotating said rod and moving said flap from said first to said second position when activated and for permitting said spring to rotate said rod to return said flap to said first position when de-activated, and a hollow guide hood connected between said grinder oulet orifice and said opening for delivering dry ground coffee from said grinder to said brewing basket when said flap is in said second position.

18. The system of claim 17 further comprising a compressible, resilient gasket connected to an upper surface of said plate around said opening for enhancing the seal of said flap in said opening when said flap is in said first position.

19. The system of claim 17 further comprising a finger tab fixedly connected to said rod for rotational movement therewith, said tab extending through a second opening in said plate for manual operation from beneath said plate, said tab being tiltible by hand to rotate said rod in opposition to said spring to tilt said flap away from said first mentioned opening to facilitate inspection and cleaning of said guide hood.

20. The system of claim 17 wherein said flap maintains said brew basket in comunication with said opening when in said second position.

* * * * *